United States Patent
Ota et al.

(10) Patent No.: US 11,630,627 B2
(45) Date of Patent: Apr. 18, 2023

(54) ELECTRONIC DEVICE, CONTROL METHOD, AND STORAGE MEDIUM

(71) Applicant: CANON KABUSHIKI KAISHA, Tokyo (JP)

(72) Inventors: Tomohiro Ota, Tokyo (JP); Genjiro Sano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/369,799

(22) Filed: Jul. 7, 2021

(65) Prior Publication Data

US 2022/0011996 A1    Jan. 13, 2022

(30) Foreign Application Priority Data

Jul. 9, 2020  (JP) .............................. JP2020-118534

(51) Int. Cl.
*G06F 3/14*  (2006.01)
*G06T 3/60*  (2006.01)

(52) U.S. Cl.
CPC ................ *G06F 3/14* (2013.01); *G06T 3/60* (2013.01); *G09G 2320/02* (2013.01); *G09G 2340/0492* (2013.01)

(58) Field of Classification Search
CPC .............. G06T 3/60; G09G 2340/0492; G06F 2200/1614
See application file for complete search history.

(56) References Cited

U.S. PATENT DOCUMENTS

| | | | |
|---|---|---|---|
| 2006/0033760 A1* | 2/2006 | Koh ....................... | G09G 5/363 345/649 |
| 2010/0079494 A1* | 4/2010 | Sung ..................... | G06F 3/0346 345/650 |
| 2012/0162381 A1 | 6/2012 | Okegawa | |
| 2013/0222516 A1* | 8/2013 | Do ......................... | H04N 7/141 348/14.01 |
| 2014/0306919 A1 | 10/2014 | Tanaka | |
| 2015/0029224 A1 | 1/2015 | Ise | |
| 2015/0091945 A1* | 4/2015 | Uratani .................... | G06T 3/60 345/649 |
| 2021/0049984 A1* | 2/2021 | Cain ..................... | G06F 1/1694 |
| 2021/0056937 A1* | 2/2021 | Sakai .................... | G06F 3/1454 |
| 2021/0118157 A1* | 4/2021 | LeGendre ................ | G06T 7/73 |
| 2021/0233212 A1* | 7/2021 | Liu ....................... | G06F 3/0346 |

FOREIGN PATENT DOCUMENTS

| | | | | |
|---|---|---|---|---|
| CN | 105718227 A | 6/2016 | | |
| EP | 2860723 A1 * | 4/2015 | .......... | G06F 3/1454 |
| EP | 2860723 A1 | 4/2015 | | |
| JP | 2005-242074 A | 9/2005 | | |
| JP | 2010035219 A | 2/2010 | | |

* cited by examiner

*Primary Examiner* — Samantha (Yuehan) Wang
(74) *Attorney, Agent, or Firm* — Canon U.S.A., Inc. IP Division

(57) ABSTRACT

An electronic device includes a first display unit, a communication unit configured to communicate with an external device including a second display unit, and a control unit configured to rotate an image to be displayed on the first display unit, in accordance with a rotational angle in a plane parallel to a screen of the first display unit, and rotate an image to be output to the external device, in accordance with the rotational angle of the first display unit and a rotational angle in a plane parallel to a screen of the second display unit.

11 Claims, 9 Drawing Sheets

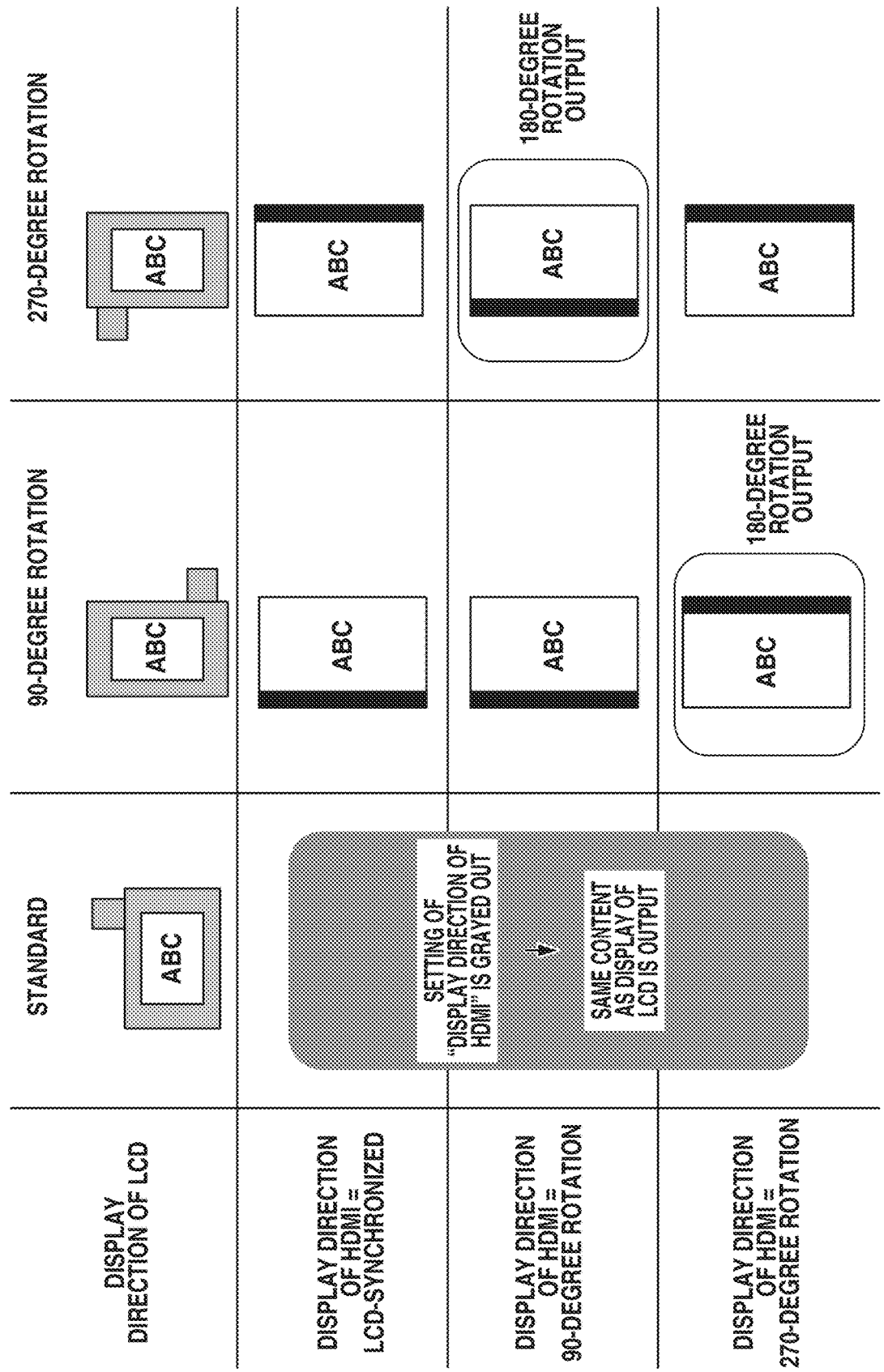

FIG.8A
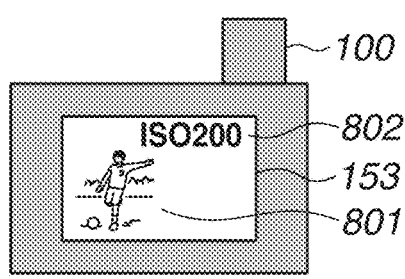
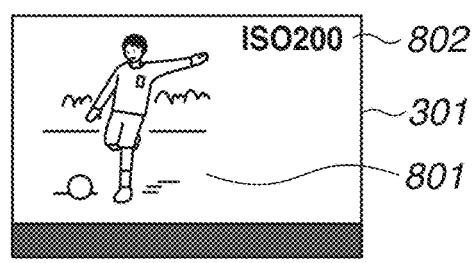
FIG.8B
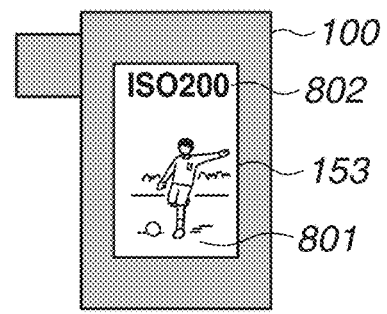
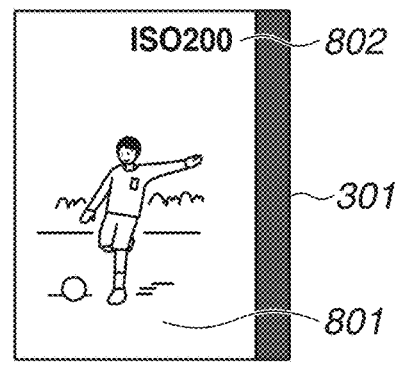
FIG.8C
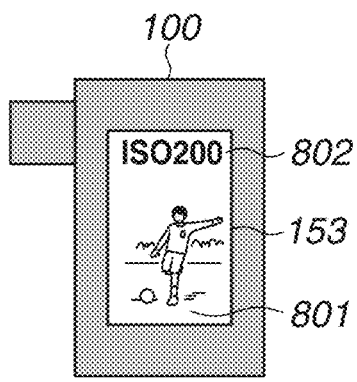
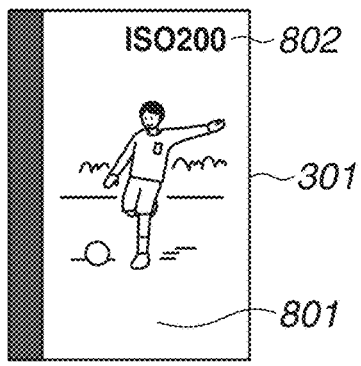
FIG.8D
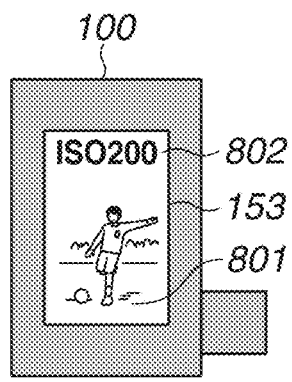
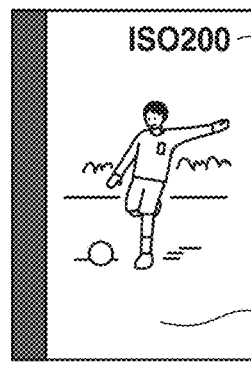
FIG.8E
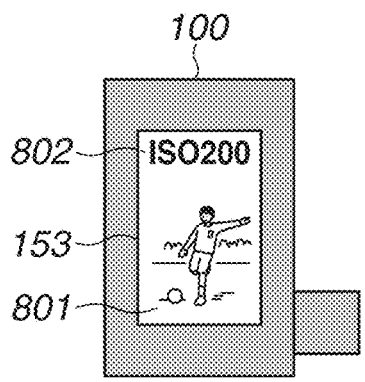
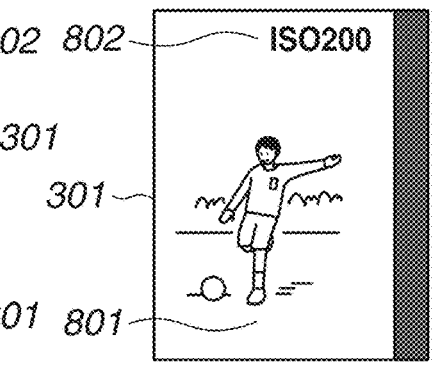

ELECTRONIC DEVICE, CONTROL METHOD, AND STORAGE MEDIUM

BACKGROUND OF THE INVENTION

Field of the Invention

The present invention relates to an electronic device and a control method of the same, and relates particularly to a technique of displaying an image on a display unit that can rotate the image.

Description of the Related Art

So-called vertical image capturing for capturing an image with composition in which a long side of the image corresponds to a longitudinal direction is becoming popular. Japanese Patent Application Laid-Open No. 2010-35219 discusses a technique of displaying a captured image onto a display unit at an inverted horizontal-to-vertical ratio by relative rotation, by 90°, between a first casing for capturing an image of a subject and a second casing including the display unit about a connecting shaft that relatively-rotatably connects the first casing and the second casing.

SUMMARY OF THE INVENTION

According to an aspect of the present invention, an electronic device includes a first display unit, a communication unit configured to communicate with an external device including a second display unit, and a control unit configured to rotate an image to be displayed on the first display unit, in accordance with a rotational angle in a plane parallel to a screen of the first display unit, and rotate an image to be output to the external device, in accordance with the rotational angle of the first display unit and a rotational angle in a plane parallel to a screen of the second display unit.

Further features of the present invention will become apparent from the following description of exemplary embodiments with reference to the attached drawings.

BRIEF DESCRIPTION OF THE DRAWINGS

FIG. 7 is a diagram illustrating orientations of images to be displayed on an LCD and a monitor based on a combination of orientations of a camera and the monitor.

FIGS. 8A, 8B, 8C, 8D, and 8E are diagrams each illustrating a display example of a captured image and image capturing information in each state of orientations of a camera and a monitor.

DESCRIPTION OF THE EMBODIMENTS

Figure 1:
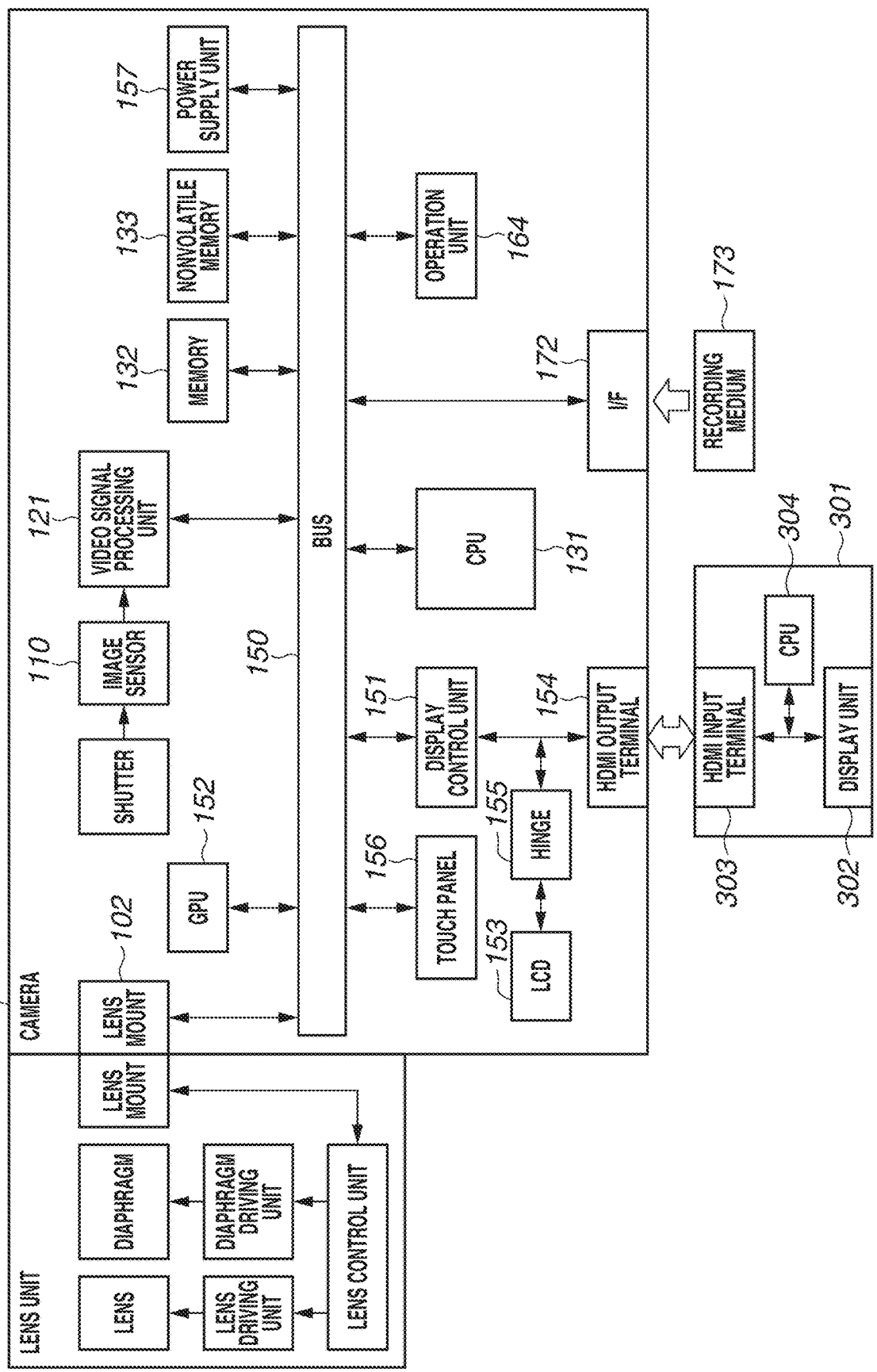
FIG. 1 is a block diagram illustrating a configuration example of a video camera serving as an example of an apparatus to which a configuration of the present exemplary embodiment can be applied.

Hereinafter, exemplary embodiments of the present invention will be described with reference to the drawings. FIG. 1 is a block diagram illustrating a configuration of a video camera 100.

A lens mount 102 is an outside lens connection unit. An image sensor 110 is an image sensor including a charge-coupled device (CCD) image sensor or a complementary metal-oxide semiconductor (CMOS) image sensor that converts a light flux having passed through an outside lens attached to the lens mount 102, into an electronic signal.

A video signal processing unit 121 generates image data by performing predetermined calculation processing using a signal converted by the image sensor 110. Based on a calculation result obtained by the video signal processing unit 121, a central processing unit (CPU) 131 performs exposure control and distance measurement control. Through-the-lens (TTL) system autofocus (AF) processing and autoexposure (AE) processing are thus performed. The video signal processing unit 121 further performs predetermined calculation processing, and performs TTL system automatic white balance (AWB) processing, based on the obtained calculation result.

Image data processed by the video signal processing unit 121 is held in a memory 132, and then written into a recording medium 173 via an interface (I/F) 172. The image data held in the memory 132 can be output from a high-definition multimedia interface (HDMI) output terminal 154 via a display control unit 151.

A nonvolatile memory 133 is a memory serving as an electrically erasable programmable recording medium. For example, a flash read-only memory (ROM) is used as the nonvolatile memory 133. The nonvolatile memory 133 stores operation constants of the CPU 131 and programs. The programs refer to computer programs for executing various flowcharts to be described below in the present exemplary embodiment.

The CPU 131 is a control unit including at least one processor or circuit, and controls the entire video camera 100 via a bus 150. By executing a program stored in the above-described nonvolatile memory 133, the CPU 131 implements each piece of processing according to the present exemplary embodiment, which will be described below.

For example, a random access memory (RAM) is used as the memory 132. Operation constants and variables of the CPU 131 are loaded onto the memory 132. The memory 132 also serves as an image display memory (video RAM (VRAM)). The CPU 131 also performs display control by controlling the memory 132 and the display control unit 151.

A graphics processing unit (GPU) 152 reads out character font data and icon image data from the nonvolatile memory 133, and draws on-screen display (OSD) data onto the VRAM of the memory 132. By drawing an icon and characters in a 90-degree rotated state or a 270-degree rotated state, it is also possible to draw a VRAM specialized in vertical image capturing. In other words, a VRAM can be drawn in a display direction different from a reference direction by 90 degrees.

The display control unit 151 reads out an image and the VRAM of the OSD from the memory 132, performs predetermined calculation, such as VRAM combination, and then outputs a video signal to a liquid crystal display (LCD) 153 and the HDMI output terminal 154. The display control unit 151 can perform 180-degree rotated display by reading out a VRAM upside down and right side left as described below. The display control unit 151 can also output a control signal for controlling an external monitor 301 connected to the video camera 100, from the HDMI output terminal 154.

A hinge 155 is a connection unit that has a biaxial rotational mechanism and is disposed between the LCD 153 and a casing 101. The hinge 155 can realize at least two movable configurations including a state in which the hinge 155 is operated to set the LCD 153 at a position in contact with the casing 101 and a screen to face outward, and a state in which the hinge 155 is operated to set the LCD 153 at a position separated from the casing 101 and the screen to face inward. The hinge 155 also has a function of detecting whether the current state is either of the states.

A touch panel 156 can detect a finger touch on the LCD 153, and the CPU 131 can read a coordinate of the touched position.

A power supply unit 157 supplies power to the entire video camera 100.

An operation unit 164 is an operation unit including operation members, such as various switches and buttons, for receiving various operations from a user. The operation unit 164 at least includes a power switch, a menu key, a direction key, a determination key, and an assign button.

The external monitor 301 is an external monitor (external device) connectable with the video camera 100 via an HDMI input terminal 303 and a cable connected to the HDMI output terminal 154. A display unit 302 is a display unit of the external monitor 301. Under the control of a CPU 304, the display unit 302 can display (can output) a video signal output from the video camera 100. The external monitor 301 includes a supporting column and a leg suitable for the orientation in which a long side of the display unit 302 corresponds to a horizontal direction. In the present exemplary embodiment, the orientation is treated as a reference direction of the external monitor 301. The external monitor 301 may include a supporting column rotatable in the orientation in which the long side of the display unit 302 corresponds to a vertical direction. Alternatively, the external monitor 301 may include an attachment unit mountable to the video camera 100 via an accessory shoe 104 to be described below.

An orientation detection unit (not illustrated in FIG. 1) that can detect the orientation of the video camera 100 may be disposed in the video camera 100. In this case, the CPU 131 acquires a display direction of the LCD 153 in accordance with the detection result of the orientation detection unit. The display direction is defined as a rotational angle in a plane parallel to the screen of the LCD 153 from a reference orientation when the reference orientation (reference direction) refers to a state in which the long side of the screen of the LCD 153 corresponds to the horizontal direction, and the screen faces toward a back surface direction of the video camera 100. In other words, the display direction is defined as a rotational angle in the plane parallel to the screen of the LCD 153. The same applies to the external monitor 301, and the display direction of the external monitor 301 is defined as a rotational angle in a plane parallel to a screen of the external monitor 301.

Figure 2B:
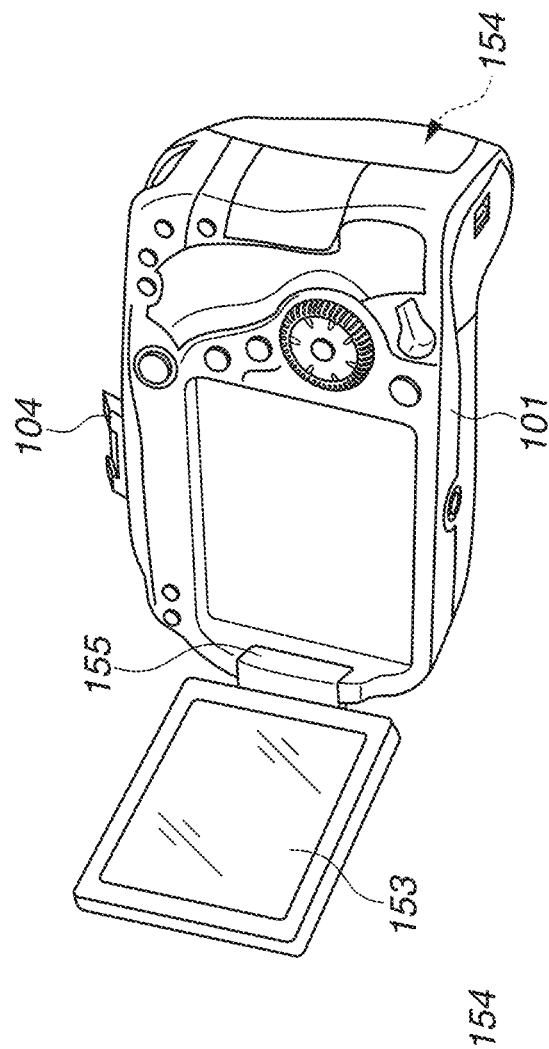
FIGS. 2A, 2B, and 2C are external views of the video camera serving as an example of an apparatus to which the configuration of the present exemplary embodiment can be applied.
Figure 2A:
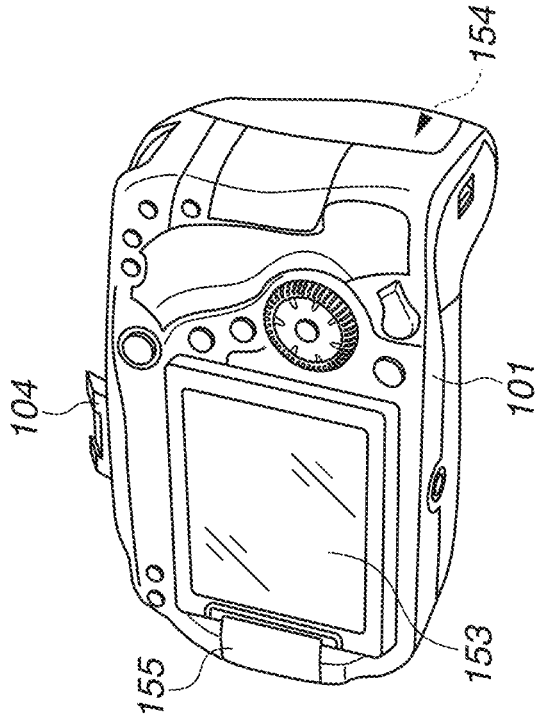
Figure 2C:
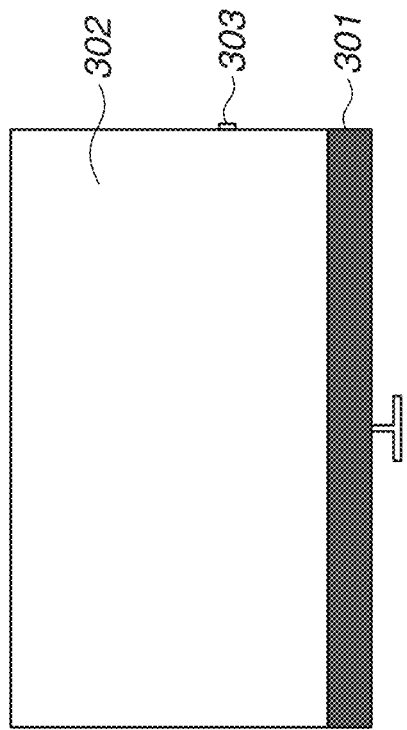

FIGS. 2A and 2B are external views of the video camera 100 according to the present exemplary embodiment. FIG. 2C is an external view of the external monitor 301.

FIG. 2A illustrates the state in which the hinge 155 is operated to set the LCD 153 at a position to be in contact with the casing 101 and the screen to face outward. In this orientation state, both of the image sensor 110 and the LCD 153 are in the orientation in which their long sides correspond to the horizontal direction, and an image displayed in the LCD 153 is also set in a landscape orientation. In this state, the same landscape image as the image displayed on the LCD 153 is displayed on the display unit 302 of the external monitor 301. Because the LCD 153 and the display unit 302 both include landscape display regions, it is possible to display landscape images by effectively utilizing the respective display regions. In the present exemplary embodiment, the orientation of the video camera 100 in the above-described state, that is to say, a state in which a longer direction of the LCD 153 corresponds to the horizontal direction is treated as the orientation of the reference direction of the video camera 100.

In a case where the video camera 100 is set in an orientation rotated by 90 degrees from the reference direction on the display surface of the LCD 153, the image sensor 110 and the LCD 153 are both set in the orientation in which their long sides correspond to the vertical direction. For capturing a higher definition image of a vertically long subject, such as a person in a standing posture, it is desirable to capture the image in this orientation, that is to say, it is desirable to perform vertical image capturing. The same applies to a case where the video camera 100 is set in an orientation rotated by 270 degrees from the reference direction on the display surface of the LCD 153. The user selects either orientation of 90-degree rotation and 270-degree rotation that is to be used in vertical image capturing, in consideration of the state of an obstacle existing near the video camera 100, the operability of the operation unit 164, the layout of an accessory or a cable attached to the video camera 100, and conform of the user capturing an image against fatigue. Depending on an image capturing situation, it can be considered that a series of image capturing processes is performed while the user frequently switches between the orientation of 90-degree rotation and the orientation of 270-degree rotation.

On the other hand, in a case where the external monitor 301 is set in the orientation rotated by 90 degrees from the reference direction on the display surface of the display unit 302, the screen of the external monitor 301 is set in the orientation in which the long side corresponds to vertical direction. For monitoring an image vertically captured by the video camera 100, it is desirable to set the external monitor 301 in this orientation. The same applies to a case where the external monitor 301 is set in the orientation rotated by 270 degrees from the reference direction on the display surface of the external monitor 301. The user selects either orientation of 90-degree rotation and 270-degree rotation as the orientation of the external monitor 301, in consideration of an orientation to which a rotational mechanism included in a stand of the external monitor 301 is adapted, or an orientation suitable for an operation unit of the external monitor 301 with respect to the screen.

The casing 101 is a casing unit of the video camera 100, and encompasses the components excluding the LCD 153.

The external monitor 301 larger than the LCD 153 is attached to the accessory shoe 104, and an image output from the HDMI output terminal 154 can be monitored on the external monitor 301. With this configuration, there is no need to provide an installation location of an external monitor separately from the video camera 100, and it is possible to perform monitoring using a large monitor in a saved space. In this configuration, in a case where the video camera 100 is set in the orientation of 90-degree rotation, the external monitor 301 is also set in the orientation of 90-degree rotation, and in a case where the video camera 100 is set in the orientation of 270-degree rotation, the external monitor 301 is also set in the orientation of 270-degree rotation.

FIG. 2B illustrates a state in which the hinge 155 is rotated by 180 degrees from the state illustrated in FIG. 2A, and the LCD 153 is rotated to face the same direction as the LCD 153 in FIG. 2A, in the reference orientation of the video camera 100.

In this state, in a case where an image displayed in the reference direction in FIG. 2A is displayed as-is on the LCD 153, an image inverted vertically and horizontally is displayed on the LCD 153. For achieving a desirable display mode, the CPU 131 causes the display control unit 151 to output an image rotated by 180 degrees to the LCD 153, based on a rotational state of the hinge 155. The CPU 131 can thus perform display in apparently the same orientation as that in FIG. 2A. In the present exemplary embodiment, the orientation in FIG. 2A and the orientation in FIG. 2B are both treated as orientations in the reference direction of the video camera 100.

Figure 3:
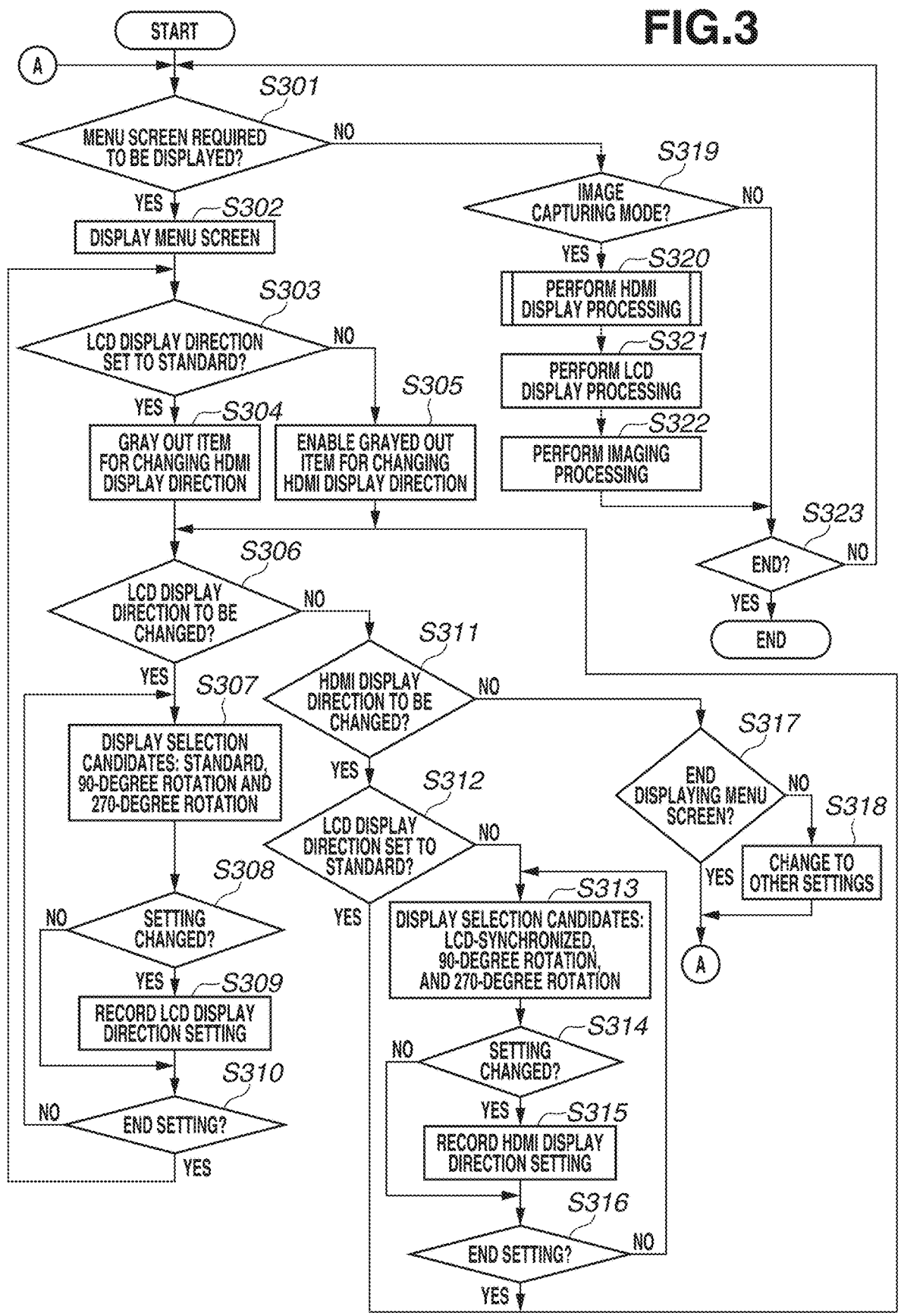
FIG. 3 is a flowchart illustrating display processing according to the present exemplary embodiment.

Display processing according to the present exemplary embodiment will be described with reference to FIG. 3. The processing is implemented by the CPU 131 loading a program recorded on the nonvolatile memory 133, onto the memory 132, and executing the program. The processing is started when the power of the video camera 100 is turned on by the operation of the power switch included in the operation unit 164, and display on the LCD 153 and the external monitor 301 becomes executable.

In step S301, the CPU 131 determines whether menu display is requested by pressing of the menu key included in the operation unit 164. In a case where the CPU 131 determines that a menu screen is required to be displayed (YES in step S301), the processing proceeds to step S302. In a case where the CPU 131 determines that a menu screen is not required to be displayed (NO in step S301), the processing proceeds to step S319.

In step S302, the CPU 131 displays the menu screen on the LCD 153. On the menu screen, for example, items indicating a setting of a time, a setting related to autofocus (AF) processing, and a setting indicating whether to superimpose information display on a live view (LV) screen are displayed for each page. On the menu screen, items indicating a setting related to the display direction of the LCD 153, and a setting related to the display direction of the external monitor 301 via an HDMI are also displayed as described below. On the menu screen, the user can select an item to be set, using the direction key included in the operation unit 164. Each menu setting can be assigned to the assign button included in the operation unit 164. By pressing the assign button to which a menu setting is assigned, the setting can be changed any time in accordance with a processing procedure (not illustrated) without opening the menu screen.

Figure 4A:
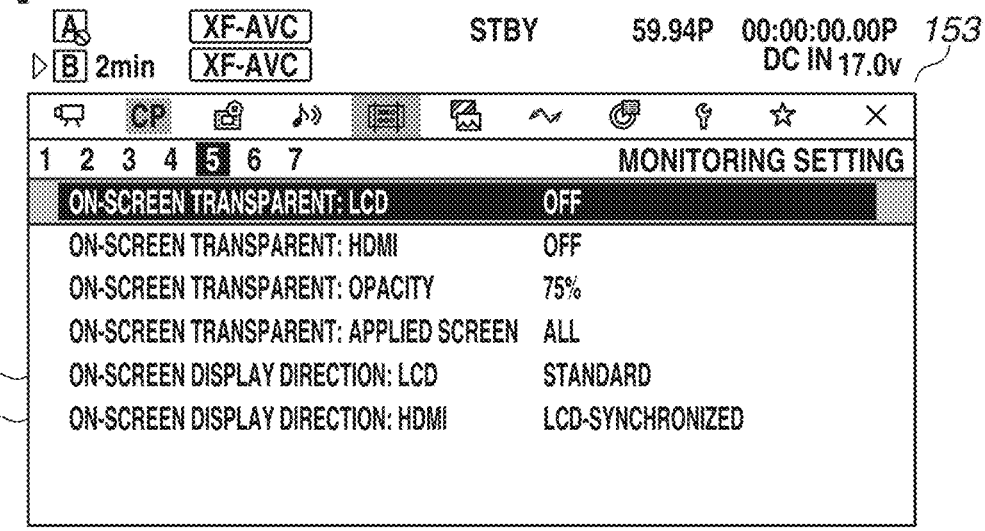
FIGS. 4A, 4B, and 4C are diagrams each illustrating an example of a menu screen according to the present exemplary embodiment.
Figure 4B:
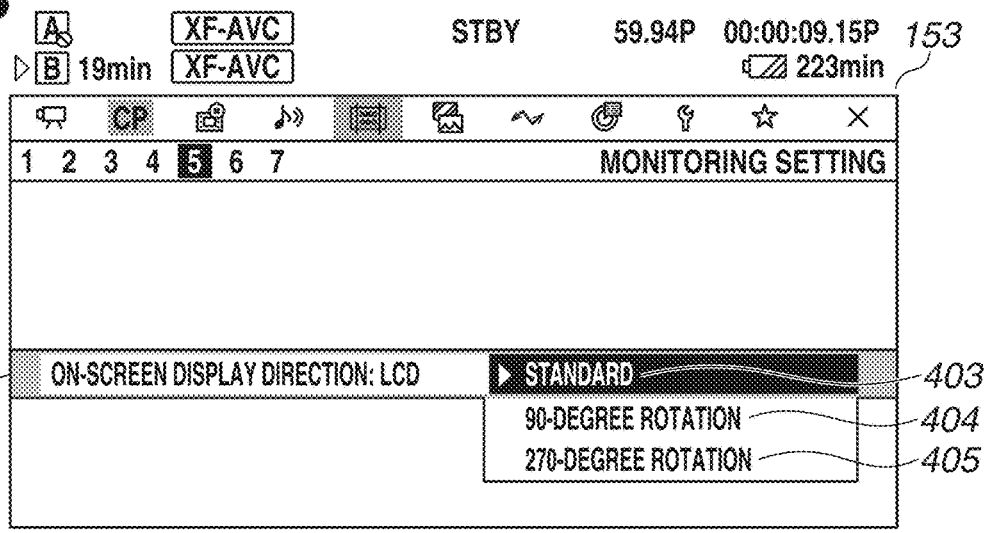
Figure 4C:
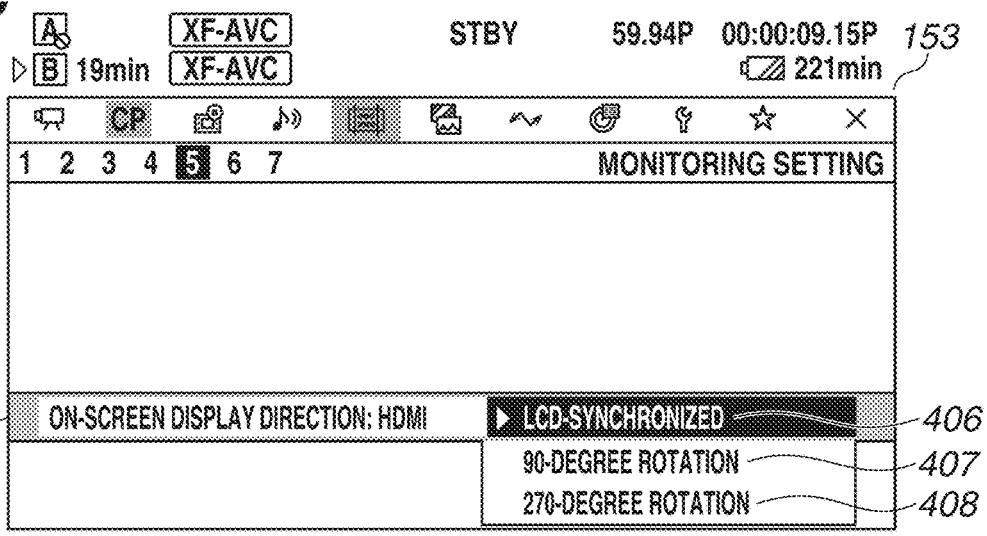

Items to be displayed on the menu screen will now be described with reference to FIGS. 4A, 4B, and 4C. As illustrated in FIG. 4A, the menu screen includes the following setting items. More specifically, an item 401 for setting a display direction of the LCD 153 (hereinafter, an LCD display direction), and an item 402 for setting a display direction of a video signal to be output from the HDMI output terminal 154 (hereinafter, an HDMI display direction) are displayed. By selecting any of these items, a display direction can be set.

The display direction refers to a rotational direction of the display of an image and characters to be output, and refers to a display angle or a rotational angle that is based on a display orientation set in a case where rotation processing is not performed. For example, the display direction set to standard refers to a state in which the displayed image and character viewed from the user are in an easy-to-read orientation when the video camera 100 and the external monitor 301 are set in the orientation of the reference direction (the video camera 100 is in the state illustrated in FIG. 2A, and the external monitor 301 is in the state illustrated in FIG. 2C). Each reference direction indicates a case where a longer direction of a display surface extends along the horizontal direction, and the bottom surface of each apparatus faces a gravitational force direction. The reference direction of a monitor corresponds to a direction in which the monitor is set in such a manner that a longer direction becomes horizontal in an orientation in which a leg is attached. In short, a standard display direction is a direction in which display output is performed without performing rotation processing. When a display direction is set to 90-degree rotation, an image, characters, and an icon are output in such a manner as to be displayed on a display unit rotated clockwise by 90 degrees with respect to the standard display state. With this configuration, when the display unit is rotated clockwise by 90 degrees, an image and characters are displayed in a direction easy-to-read for the user. The standard setting indicates the reference direction, and indicates a display direction of 0-degree rotation (output without performing rotation processing).

In step S303, the CPU 131 determines whether the set display direction of the LCD 153 is standard. The set display direction of the LCD 153 and the HDMI display direction are recorded on the memory 132. The CPU 131 performs the determination by referring to the memory 132. In a case where the CPU 131 determines that the display direction of the LCD 153 is set to standard (YES in step S303), the processing proceeds to step S304. In a case where the CPU 131 determines that the display direction of the LCD 153 is not set to standard (NO in step S303), the processing proceeds to step S305.

In step S304, the CPU 131 grays out the item 402 on the menu screen being displayed on the LCD 153. The grayed-out item becomes visually distinguishable from other items, and indicates that the item is in a state of not receiving a setting change. The standard LCD display direction can be rephrased as a direction in which the video camera 100 is in the orientation of the reference direction, and in an orientation for capturing a landscape image. Thus, in a case where the orientation of the external monitor 301 is also set to the orientation of the reference direction, the user can check a captured image in a direction in which the video camera 100 performs image capturing. In other words, because a display direction needs not be set to 90-degree rotation or 270-degree rotation, in a case where the LCD display direction is set to standard, the HDMI display direction is also set to the reference direction. By graying out the item 402 as described above, it is possible to prevent the user from selecting a setting unnecessary to be changed, and avoid confusion and an increase in the number of setting operations. When the item 402 is grayed out, even in a case where the assign button to which the item 402 is assigned is pressed, a setting cannot be changed. For example, in a case where the video camera 100 performs vertical image capturing, there is a possibility that the HDMI display direction is set to 90-degree rotation or 270-degree rotation as be described below. When an image capturing direction is changed to image capturing in the landscape orientation from this state, the user is highly likely to change the display direction of the LCD 153 to standard, and further change the orientation of the external monitor 301 to the orientation of the reference direction. In this case, because the HDMI display direction is desirably set to the standard direction similarly to the display direction of the LCD 153, after the item 402 is grayed out, as described above, an image is output without performing rotation processing irrespective of the state of an HDMI display setting. With this configuration, the number of setting operations to be performed by the user can be reduced, while an image is output in an orientation easy-to-read for the user.

In step S305, the CPU 131 enables the grayed out item, i.e., the item 402, on the menu screen being displayed on the LCD 153.

In step S306, the CPU 131 determines whether an instruction for changing the LCD display direction is issued on the menu screen. In other words, the CPU 131 determines whether the item 401 is selected on the menu screen. The selection of the item 401 or 402 can be performed by an operation on the direction key and the determination key included in the operation unit 164, or a touch operation on the LCD 153. In a case where the CPU 131 determines that an instruction for changing the LCD display direction is issued (YES in step S306), the processing proceeds to step S307. In a case where the CPU 131 determines that an instruction for changing the LCD display direction is not issued (NO in step S306), the processing proceeds to step S311.

In step S307, the CPU 131 displays selection candidates of the LCD display direction on the LCD 153. More specifically, the CPU 131 displays standard, 90-degree rotation, and 270-degree rotation as selection candidates. FIG. 4B illustrates an example indicating selection candidates of the LCD display direction. An item 403 indicates that the LCD display direction is set to standard, an item 404 indicates that the LCD display direction is set to 90-degree rotation, and an item 405 indicates that the LCD display direction is set to 270-degree rotation. The user can select any of these items. Both of the case of 90-degree rotation and the case of 270-degree rotation correspond to rotational angles different from the standard direction by 90 degrees. The selection of an item can be performed by an operation on the direction key and the determination key included in the operation unit 164. A setting of setting the display direction of the LCD 153 to standard is a setting for capturing a landscape image with the video camera 100 being set in the orientation of the reference direction. A setting of setting the display direction of the LCD 153 to 90-degree rotation is a setting for capturing a portrait image with the video camera 100 being set in an orientation rotated clockwise by 90 degrees from the reference direction. In addition, a setting of setting the display direction of the LCD 153 to 270-degree rotation is a setting for capturing a portrait image with the video camera 100 being set in an orientation rotated clockwise by 270 degrees from the reference direction. In other words, while a setting of a display direction follows the orientation of the video camera 100, by enabling the user to set the orientation of image capturing on the menu screen in an image capturing site, it becomes easier to correctly set other related items because the user can be aware of an imaging setting.

In step S308, the CPU 131 determines whether the setting is changed by the user from the setting of the currently-set LCD display direction. In a case where the CPU 131 determines that the setting of the LCD display direction is changed (YES in step S308), the processing proceeds to step S309. In a case where the CPU 131 determines that the setting of the LCD display direction is not changed (NO in step S308), the processing proceeds to step S310.

In step S309, the CPU 131 records the LCD display direction setting on the memory 132.

In step S310, the CPU 131 determines whether to end the setting of the LCD display direction. The setting of the LCD display direction can be ended by pressing of a return button 73. In a case where the CPU 131 determines that the setting of the LCD display direction is to be ended (YES in step S310), the processing returns to step S303. In a case where the CPU 131 determines that the setting of the LCD display direction is not to be ended (NO in step S310), the processing returns to step S307. The processing in step S310 may not be performed. A configuration of automatically changing the setting of the display direction of the LCD 153 instead of setting the display direction of the LCD 153 in accordance with a processing procedure from steps S306 to S310 can also be considered. For example, in a case where the video camera 100 includes an orientation detection unit, such as a gravity sensor, an orientation can be identified. Based on the detection result of the orientation, the CPU 131 can determine whether the video camera 100 is in the orientation of the reference direction, in the orientation of 90-degree rotation, or the orientation of 270-degree rotation, and can automatically set a display direction suitable for the orientation.

In step S311, the CPU 131 determines whether an instruction for changing the HDMI display direction is issued on the menu screen. In other words, the CPU 131 determines whether the item 402 is selected on the menu screen. In a case where the CPU 131 determines that an instruction for changing the HDMI display direction is issued (YES in step S311), the processing proceeds to step S312. In a case where the CPU 131 determines that an instruction for changing the HDMI display direction is not issued (NO in step S312), the processing proceeds to step S317.

In step S312, the CPU 131 determines whether the current setting of the LCD display direction is set to standard. In a case where the LCD display direction is set to standard (YES in step S312), the processing proceeds to step S306. In a case where the LCD display direction is not set to standard (NO in step S312), the processing proceeds to step S313. In a case where the LCD display direction is set to standard, because the setting of the HDMI display direction is grayed out as described above, setting change processing is not performed, and the processing proceeds to step S306.

In step S313, the CPU 131 displays selection candidates of the HDMI display direction on the LCD 153. More specifically, the CPU 131 displays LCD-synchronized, 90-degree rotation, and 270-degree rotation as selection candidates. FIG. 4C illustrates an example indicating selection candidates of the HDMI display direction. An item 406 indicates that the HDMI display direction is set to LCD-synchronized, an item 407 indicates that the HDMI display direction is set to 90-degree rotation, and an item 408 indicates that the HDMI display direction is set to 270-degree rotation. The user can select any of these items. Both of the case of 90-degree rotation and the case of 270-degree rotation correspond to rotational angles different from the reference direction by 90 degrees, and indicate that an image is displayed in the portrait orientation. A selection operation in step S313 can be performed by an operation on the direction key and the determination key included in the operation unit 164. A setting of setting the HDMI display direction to 90-degree rotation is a setting for displaying an image in a portrait orientation in which the external monitor 301 is rotated clockwise by 90 degrees from the reference direction. A setting of setting the HDMI display direction to 270-degree rotation is a setting for displaying an image in a portrait orientation in which the external monitor 301 is rotated clockwise by 270 degrees from the reference direction. In other words, the setting of the HDMI display direction indicates the orientation of the external monitor 301. In this manner, by making the orientation of the external monitor 301 selectable from among camera-synchronized, 90-degree rotation, and 270-degree rotation, and further performing display output in accordance with the selected orientation, it is possible to reduce the number of setting operations that is performed when the external monitor 301 is attached integrally with the video camera 100, or is changed in orientation in synchronization with the video camera 100. In other words, by setting the orientation of the external monitor 301 to camera-synchronized, it is possible to remove a burden of resetting the display direction of the external monitor 301 each time the orientation of the video camera 100 is changed. By setting a display direction in other cases, it is possible to appropriately output an image in accordance with the orientation of the external monitor 301.

In step S314, the CPU 131 determines whether the setting is changed by the user from the setting of the currently-set HDMI display direction. In a case where the CPU 131 determines that the setting of the HDMI display direction is changed (YES in step S314), the processing proceeds to step S315. In a case where the CPU 131 determines that the setting of the HDMI display direction is not changed (NO in step S314), the processing proceeds to step S316.

In step S315, the CPU 131 records the HDMI display direction setting on the memory 132.

In step S316, the CPU 131 determines whether to end the setting of the HDMI display direction. The setting of the HDMI display direction can be ended by pressing of the return button 73. In a case where the CPU 131 determines that the setting of the HDMI display direction is to be ended (YES in step S316), the processing returns to step S306. In a case where the CPU 131 determines that the setting of the HDMI display direction is not to be ended (NO in step S316), the processing returns to step S313. The processing in step S316 may not be performed. In step S317, the CPU 131 determines whether to end displaying the menu screen. An end instruction of the menu screen can be issued by pressing of the menu key included in the operation unit 164. In a case where the CPU 131 determines that the display of the menu screen is to be ended (YES in step S317), the processing returns to step S301. In a case where the CPU 131 determines that the display of the menu screen is not to be ended (NO in step S317), the processing proceeds to step S318.

In step S318, the CPU 131 changes the setting item to other items. For example the CPU 131 changes to setting items, such as a setting related to white balance (WB) processing, and a setting related to imaging resolution.

In step S319, the CPU 131 determines whether a mode is switched to an image capturing mode. The image capturing mode can be switched by pressing of a shutter button or a mode selection switch. In a case where the CPU 131 determines that a mode is switched to the image capturing mode (YES in step S319), the processing proceeds to step S320. In a case where the CPU 131 determines that a mode is not switched to the image capturing mode (NO in step S319), the processing proceeds to step S323.

Figure 5:
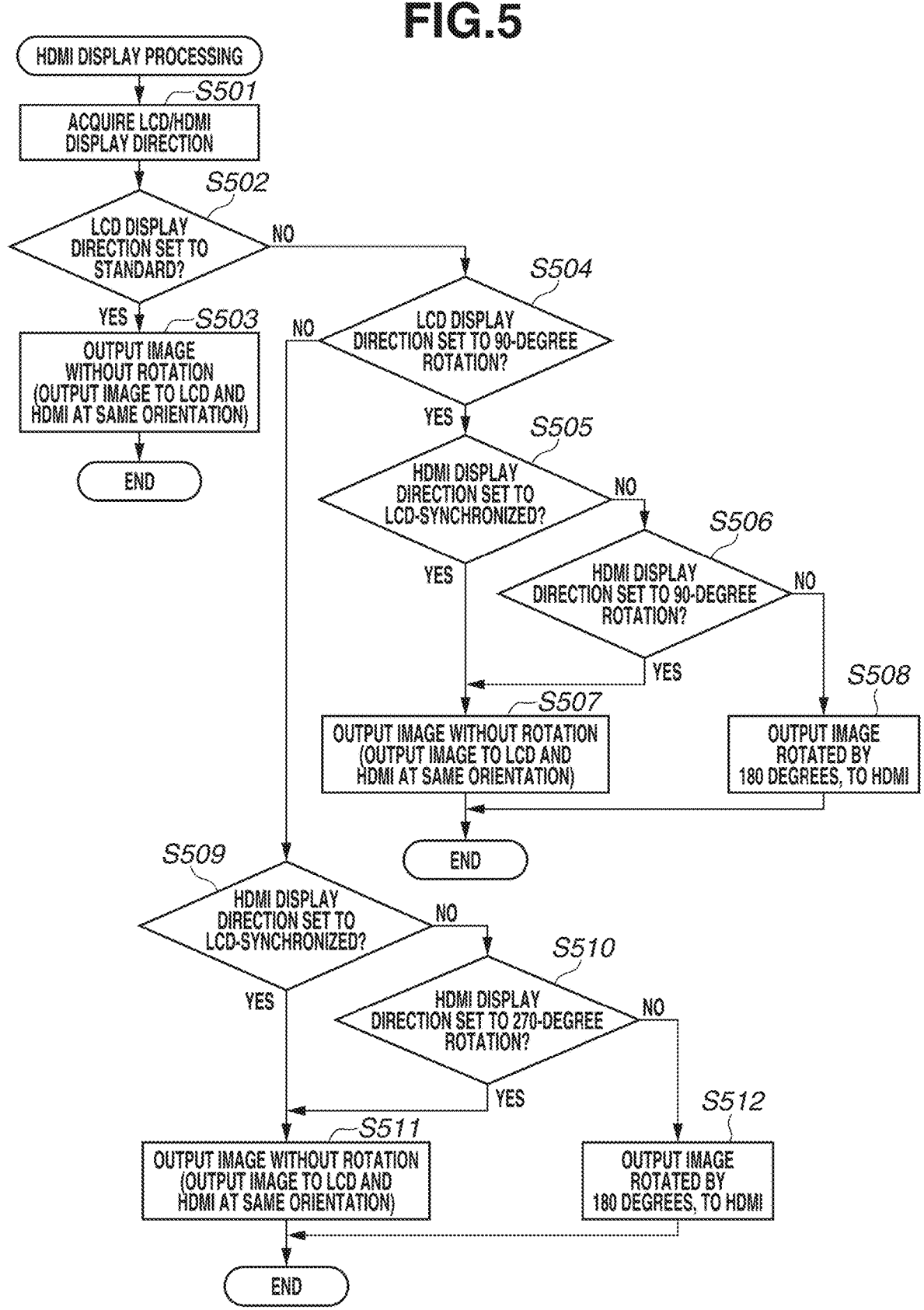
FIG. 5 is a flowchart illustrating high-definition multimedia interface (HDMI) display processing according to the present exemplary embodiment.

In step S320, the CPU 131 performs HDMI display processing illustrated in FIG. 5.

Figure 6:
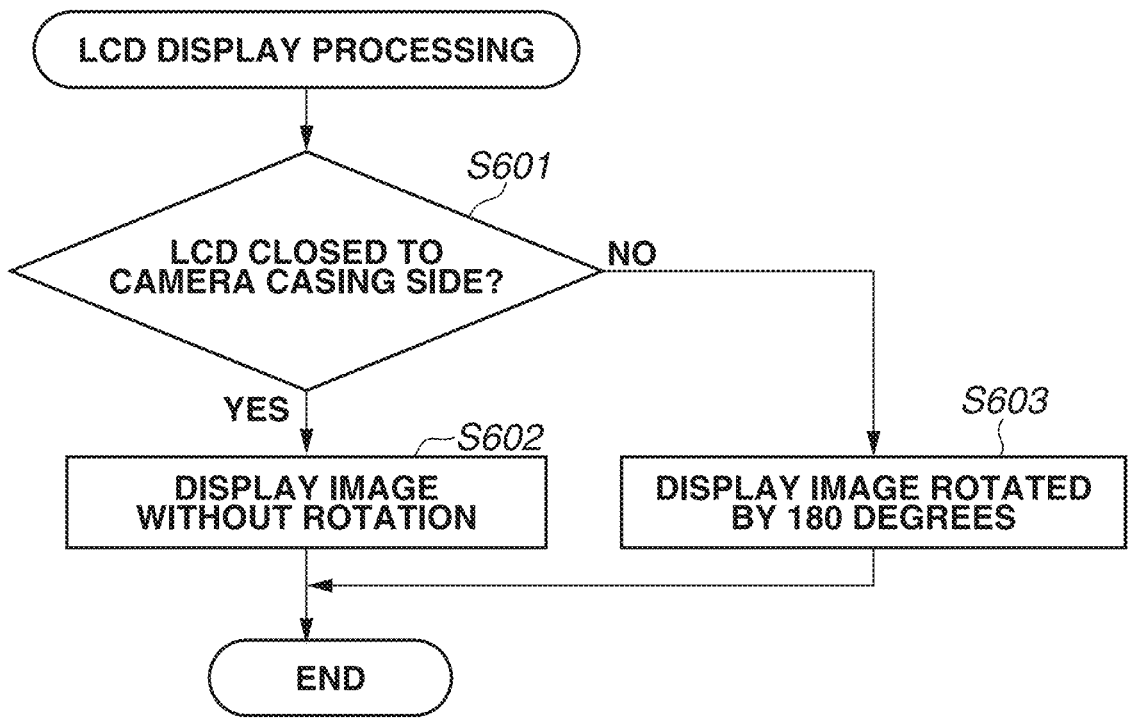
FIG. 6 is a flowchart illustrating liquid crystal display (LCD) display processing according to the present exemplary embodiment.

In step S321, the CPU 131 performs LCD display processing illustrated in FIG. 6. More specifically, the CPU 131 displays a captured image on the LCD 153 without performing rotation processing.

In step S322, the CPU 131 performs imaging processing. In the imaging processing, the CPU 131 can perform image capturing of a still image and image capturing of a moving image.

In step S323, the CPU 131 determines whether to end the display processing. The display processing is ended in a case where a power-off instruction is issued by an operation of the power switch included in the operation unit 164. In a case where the CPU 131 determines that the display processing is to be ended (YES in step S323), the processing illustrated in FIG. 3 is ended. In a case where the CPU 131 determines that the display processing is not to be ended (NO in step S323), the processing returns to step S301.

In the exemplary embodiment described above, the user can set the LCD display direction and the HDMI display direction on the menu screen.

Next, the HDMI display processing according to the present exemplary embodiment will be described with reference to FIG. 5. The processing is implemented by the CPU 131 controlling each component of the video camera 100, based on a program recorded on the nonvolatile memory 133. The HDMI display processing is started in response to the processing proceeding to step S320 of FIG. 3.

In step S501, the CPU 131 acquires the LCD display direction and the HDMI display direction from the memory 132.

In step S502, the CPU 131 determines whether the LCD display direction is set to standard. In a case where the CPU 131 determines that the LCD display direction is set to standard (YES in step S502), the processing proceeds to step S503. In a case where the CPU 131 determines that the LCD display direction is not set to standard (NO in step S502), the processing proceeds to step S504.

In step S503, the CPU 131 outputs an image and OSD (information to be displayed superimposed on the image) to an HDMI without rotation. Thus, a captured image 801 and image capturing information 802 are displayed on the external monitor 301 as illustrated in FIG. 8A. FIG. 8A illustrates that the LCD 153 of the video camera 100 and the external monitor 301 are both in the orientation of the reference direction. The captured image 801 and the image capturing information 802 are both displayed in the same orientation when viewed from the user.

In step S504, the CPU 131 determines whether the LCD display direction is set to 90-degree rotation. In a case where the CPU 131 determines that the LCD display direction is set to 90-degree rotation (YES in step S504), the processing proceeds to step S505. In a case where the CPU 131 determines that the LCD display direction is not set to 90-degree rotation (NO in step S504), the processing proceeds to step S509.

In step S505, the CPU 131 determines whether the HDMI display direction is set to LCD-synchronized. In a case where the CPU 131 determines that the HDMI display direction is set to LCD-synchronized (YES in step S505), the processing proceeds to step S507. In a case where the CPU 131 determines that the HDMI display direction is not set to LCD-synchronized (NO in step S505), the processing proceeds to step S506.

In step S506, the CPU 131 determines whether the HDMI display direction is set to 90-degree rotation. In a case where the CPU 131 determines that the HDMI display direction is set to 90-degree rotation (YES in step S506), the processing proceeds to step S507. In a case where the CPU 131 determines that the HDMI display direction is not set to 90-degree rotation (NO in step S506), the processing proceeds to step S508.

In step S507, while drawing the image capturing information 802 in a 90-degree rotated state, the CPU 131 outputs an image to the HDMI output terminal 154 in the same display direction as the LCD 153 without performing rotation processing. A display mode at this time is a mode as illustrated in FIG. 8B. FIG. 8B illustrates that the video camera 100 and the external monitor 301 are both in the orientation rotated clockwise by 270 degrees from the reference direction. The captured image 801 and the image capturing information 802 are both displayed in the same orientation when viewed from the user.

In step S508, while drawing the image capturing information 802 in a 90-degree rotated state, the CPU 131 outputs an image to the HDMI output terminal 154 in a 180-degree rotated state. A display mode at this time is a mode as illustrated in FIG. 8C. FIG. 8C illustrates that the video camera 100 is in the orientation of 270-degree rotation from the reference direction, and the external monitor 301 is in the orientation of 90-degree rotation from the reference direction. The captured image 801 and the image capturing information 802 are both displayed in the same orientation when viewed from the user. The image capturing information 802 is changed in display position in such a manner that the image capturing information 802 is located at the upper right of the screen when viewed from the user, similarly to FIG. 8A, instead of being merely displayed in a rotated state. Processing of rotating the HDMI display direction by 180 degrees can be implemented by changing a readout order of a VRAM to be described below. Instead of rotating an image by changing a readout order of a VRAM, a control signal for rotating an image by 180 degrees may be output from the display control unit 151 to the HDMI output terminal 154. If an external monitor connected to the HDMI output terminal 154 supports a 180-degree rotation signal, an image can be displayed in a 180-degree rotated state by the function of the external monitor. With this configuration, a function of changing a readout order of a VRAM for HDMI output becomes unnecessary in the video camera 100. On the other hand, in the case of rotating an image by changing a readout order of a VRAM, because an external monitor needs not have a function of receiving a 180-degree rotated signal and displaying a rotated image, 180-degree rotated display can be implemented by a general monitor. In step S509, the CPU 131 determines whether the HDMI display direction is set to LCD-synchronized. In a case where the CPU 131 determines that the HDMI display direction is set to LCD-synchronized (YES in step S509), the processing proceeds to step S511. In a case where the CPU 131 determines that the HDMI display direction is not set to LCD-synchronized (NO in step S509), the processing proceeds to step S510.

In step S510, the CPU 131 determines whether the HDMI display direction is set to 270-degree rotation. In a case where the CPU 131 determines that the HDMI display direction is set to 270-degree rotation (YES in step S510), the processing proceeds to step S511. In a case where the CPU 131 determines that the HDMI display direction is not set to 270-degree rotation (NO in step S510), the processing proceeds to step S512.

In step S511, while drawing the image capturing information 802 in a 270-degree rotated state, the CPU 131 outputs an image including the same content as the image displayed on the LCD 153, to the HDMI output terminal 154 without performing rotation processing. A display mode at this time is a mode as illustrated in FIG. 8D. FIG. 8D illustrates that the video camera 100 and the external monitor 301 are both in the orientation rotated clockwise by 90 degrees from the reference direction. The captured image 801 and the image capturing information 802 are both displayed in the same orientation when viewed from the user.

In step S512, while drawing the image capturing information 802 in a 270-degree rotated state, the CPU 131 outputs an image to the HDMI output terminal 154 in a 180-degree rotated state. A display mode at this time is a mode as illustrated in FIG. 8E. FIG. 8E illustrates that the video camera 100 is in the orientation of 90-degree rotation from the reference direction, and the external monitor 301 is in the orientation of 270-degree rotation from the reference direction. The captured image 801 and the image capturing information 802 are both displayed in the same orientation when viewed from the user. Next, LCD display processing according to the present exemplary embodiment will be described with reference to FIG. 6. The processing is implemented by the CPU 131 controlling each component of the video camera 100, based on a program recorded on the nonvolatile memory 133. The LCD display processing is started in response to the processing proceeding to step S321 of FIG. 3.

In step S601, the CPU 131 acquires an operating state of the hinge 155, and determines whether the hinge 155 is in the state illustrated in FIG. 2A. In a case where the CPU 131 determines that the hinge 155 is in the state illustrated in FIG. 2A (YES in step S601), the processing proceeds to step S602. In a case where the CPU 131 determines that the hinge 155 is not in the state illustrated in FIG. 2A (NO in step S601), the processing proceeds to step S603.

In step S602, the CPU 131 displays an image being captured, on the LCD 153 without rotation.

In step S603, the CPU 131 displays an image being captured, on the LCD 153 in a 180-degree rotated state.

By the above-described processing procedure, it is possible to display an image on the LCD 153 in a direction desirable for the user, irrespective of which state of the states illustrated in FIGS. 2A and 2B the LCD 153 is in.

Figure 9:
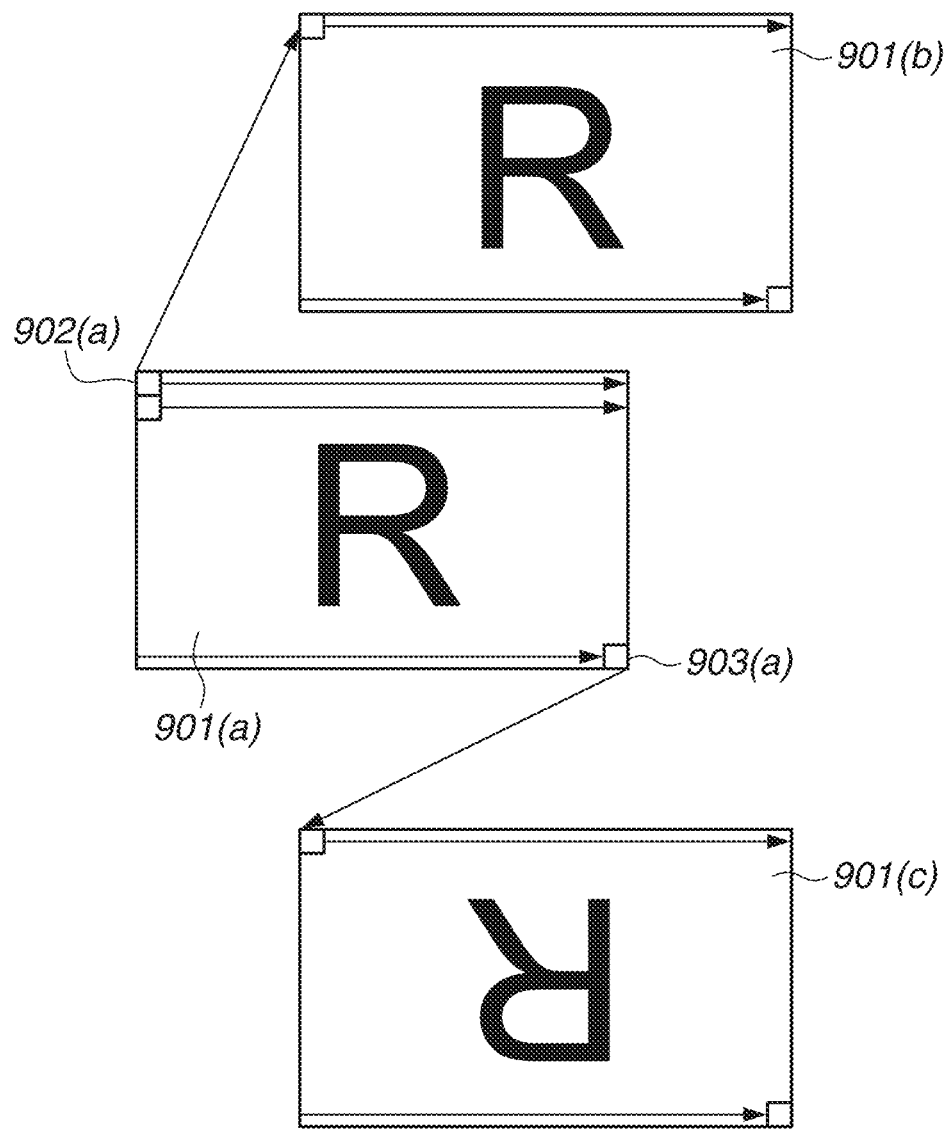
FIG. 9 is a diagram illustrating a relationship between a video random access memory (VRAM) and a readout direction.

FIG. 9 is a diagram illustrating a relationship between a VRAM and a readout direction. A VRAM can be represented as a two-dimensional surface like a screen 901(a). In the case of moving image data, generally, a VRAM is read out rightward from a left upper end pixel 902(a), and when a readout position reaches a right end pixel, a readout position moves to a left end pixel of the following line immediately below the current line. When a readout position reaches a right lower end pixel 903(a) by the scanning performed by the repetition, readout of a VRAM corresponding to one screen is completed. In a case where readout scanning is performed in the same order as drawing, and an image is displayed on the external monitor 301, a normal display 901(b) without rotation is obtained. On the other hand, in a case where readout scanning is performed in a reverse order of the drawing by reading out a VRAM from the right lower end pixel 903(a) toward the left upper end pixel 902(a), a screen 901(c) obtained by rotating the entire screen by 180 degrees can be displayed on the external monitor 301. In other words, by reading out a VRAM upside down and right side left, a screen to be displayed can be output to the external monitor 301 in a 180-degree rotated state. Control may be performed in such a manner that rotation processing is performed on the CPU 304 side of the external monitor 301.

According to the exemplary embodiment described above, it is determined whether to perform rotation processing of an image when the image is output to an HDMI, in accordance with the LCD display direction and the HDMI display direction that are set by the user. In a case where rotation processing is required, an image is output in a 180-degree rotated state.

In other words, in a case where it is determined to be NO in step S506 or NO in step S510, an image is output to the HDMI output terminal 154 in a 180-degree rotated state. With this configuration, even in a case where the orientation of the video camera 100 and the orientation of the external monitor 301 are orientations different by 180 degrees, it is possible to desirably display an image on the external monitor 301 without rotating the image upside down. Whether to output an image in a 180-degree rotated state is controlled in accordance with whether a display direction is rotated from the reference direction by 90 degrees, or rotated by 270 degrees different from the 90-degree rotation by 180 degrees. In a case where the image is not to be rotated by 180 degrees, rotation processing of the image is not performed. In other words, the orientation of the video camera 100 and the orientation of the external monitor 301 can be selected on the menu screen, and whether to rotate an image by 180 degrees is varied in accordance with the selection result. With this configuration, even in a case where image capturing or display in the portrait orientation is performed by the user setting the orientation in either orientation of the orientation of 90-degree rotation or the orientation of 270-degree rotation, display can be performed in a direction easy-to-read for the user.

In addition, in a case where it is determined to be YES in step S506 or YES in step S510, an image is output to the HDMI output terminal 154 without rotation. FIG. 7 illustrates a table separately indicating a case where an image is output to an HDMI in a 180-degree rotated state, and other cases. Because the HDMI display direction is preset to 90-degree rotation or 270-degree rotation in accordance with an installation orientation of the external monitor 301, even in a case where the user frequently changes the LCD display direction between 90-degree rotation and 270-degree rotation, in accordance with an imaging situation, there is no need to reset the HDMI display direction. It is also possible to continuously display an image and OSD on the external monitor 301 in a desirable orientation without reinstalling the external monitor 301.

In addition, in a case where it is determined to be YES in step S502, an image is output to an HDMI without rotation irrespective of a setting state of the HDMI display direction. With this configuration, even in a case where image capturing in the landscape orientation is desired to be performed during vertical image capturing, it is possible to output the same image as the image displayed on the LCD 153, to the external monitor 301 without changing the setting of the HDMI display direction. On the other hand, in a case where it is determined to be NO in step S502, that is to say, in a case where the LCD display direction is the portrait orientation, because the user is performing image capturing in the portrait orientation, the external monitor 301 is highly likely to be set in the portrait orientation. When the external monitor 301 is used in the landscape orientation, the external monitor 301 is installed in such a manner that a leg portion of the external monitor 301 is oriented toward the ground side. On the other hand, in a case where the external monitor 301 is set in the portrait orientation, it is uncertain whether the external monitor 301 is rotated by 90 degrees or rotated by 270 degrees from the orientation of the reference direction. In a case where the LCD display direction is set to 90-degree rotation and the HDMI display direction is set to 270-degree rotation, or in a case where the LCD display direction is set to 270-degree rotation and the HDMI display direction is set to 90-degree rotation, there is a possibility that a captured image and image capturing information look upside down when viewed from the user, if rotation processing of an image is not performed. Thus, in a case where the LCD display direction is set to the portrait orientation, a setting state of the HDMI display direction is determined, and rotation processing is performed in accordance with the determined setting state, and therefore it is possible to display a captured image and image capturing information in a direction easy-to-read for the user.

Irrespective of the setting state of a display direction, an image is output to an HDMI without rotation. With this configuration, even in an operation in which the external monitor 301 is installed in the accessory shoe 104, and the orientation of the video camera 100 and the orientation the external monitor 301 are always set to the same orientation, operability is enhanced. In other words, there is no need to reset the HDMI display direction each time the display direction of the LCD 153 is changed, and it is possible to always display an image on the external monitor 301 in a desirable orientation.

Instead of performing rotation processing on the video camera 100 when an image is output to an HDMI, an image may be output to the HDMI together with an instruction for rotation display, and the image may be displayed after rotation processing is performed on the external monitor 301.

The above-described various types of control that are performed by the CPU 131 may be performed by a single hardware component, or a plurality of hardware components may control the entire apparatus while sharing processing.

The exemplary embodiments of the present invention have been described in detail, but the present invention is not limited to these specific exemplary embodiments, and various configurations are also included in the present invention without departing from the gist of the invention. Furthermore, each of the above-described exemplary embodiments merely indicates an exemplary embodiment of the present invention, and the exemplary embodiments can also be appropriately combined.

The HDMI output terminal 154 can be replaced with a terminal adapted to a different video output standard, such as a serial digital interface (SDI). Also in the case of transmitting an image to an external monitor via an internet protocol (IP) using Ethernet or a wireless local area network (WLAN), the present invention can be applied.

In the above-described exemplary embodiment, the description has been given of an example case where the present invention is applied to an imaging control apparatus, but the present invention is not limited to this example, and the present invention can be applied to any electronic device as long as the electronic device can perform external video output. More specifically, the present invention can be applied to a mobile phone terminal, a portable image viewer, a printer apparatus including a viewfinder, a digital photo frame, a music player, a game machine, or an electronic book reader.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-118534, filed Jul. 9, 2020, which is hereby incorporated by reference herein in its entirety.

What is claimed is:

1. An image capturing device comprising:
a first display unit;
a processor; and
a memory storing instructions which, when executed by the processor, cause the processor of the image capturing device to:
communicate with an external device including a second display unit; and
perform control, for obtaining a portrait image, to rotate an image in accordance with a difference between a first angle which indicates rotational angle from a reference position in a plane parallel to a screen of the first display unit and a second angle which indicates a rotational angle from a reference position in a plane parallel to a screen of the second display unit and output the rotated image to the external device, and
for obtaining a landscape image, not to rotate the image regardless of difference between the first angle and a second and output the unrotated image to the external device.

2. The image capturing device according to claim 1, wherein, in a case where the first angle is 90 degrees and the second angle is 270 degrees, the instructions cause the image capturing device to perform control to rotate the image by 180 degrees and output the rotated image to the external device for obtaining the portrait image.

3. The image capturing device according to claim 1, wherein, in a case where the first angle is 270 degrees and the second angle is 90 degrees, the instructions cause the image capturing device to perform control to rotate the image by 180 degrees and output the rotated image to the external device, for obtaining the portrait image.

4. The image capturing device according to claim 1, wherein, in a case where the first angle and the second angle are same, the instructions cause the image capturing device to perform control not to rotate the image and output the unrotated image to the external device for obtaining the portrait image.

5. The image capturing device according to claim 1, wherein the instructions which, when executed by the processor, further cause the processor of the image capturing device
to detect an orientation of the first display unit,
wherein the first angle is determined in accordance with the detected orientation of the first display unit.

6. The image capturing device according to claim 1, wherein the instructions which, when executed by the processor, further cause the processor of the image capturing device to set the second angle in accordance with a selection by a user.

7. The image capturing device according to claim 1, further comprising
a lens unit; and
an imaging unit,
wherein the image capturing device generates the image by performing imaging process with the lens unit and the imaging unit.

8. The image capturing device according to claim 1, wherein the first angle is 90 degrees or 270 degrees when capturing the portrait image.

9. The image capturing device according to claim 1, wherein the first angle is 0 degrees when capturing the landscape image.

10. A control method of an electronic device that includes a first display unit, and is configured to communicate with an external device including a second display unit, the control method comprising:
performing control, for obtaining a portrait image, to rotate an image in accordance with
a difference between a first angle which indicates rotational angle from a reference position in a plane parallel to a screen of the first display unit and a second angle which indicates a rotational angle from a reference position in a plane parallel to a screen of the second display unit and output the rotated image to the external device, and
for obtaining a landscape image, not to rotate the image regardless of difference between the first angle and a second and output the unrotated image to the external device.

11. A non-transitory storage medium storing a program for causing a computer to execute a control method of an electronic device that includes a first display unit, and is configured to communicate with an external device including a second display unit, the control method comprising:
performing control, for obtaining a portrait image, to rotate an image in accordance with
a difference between a first angle which indicates rotational angle from a reference position in a plane parallel to a screen of the first display unit and a second angle which indicates a rotational angle from a reference position in a plane parallel to a screen of the second display unit and output the rotated image to the external device, and for obtaining a landscape image, not to rotate the image regardless of difference between the first angle and a second and output the unrotated image to the external device.

* * * * *